UNITED STATES PATENT OFFICE.

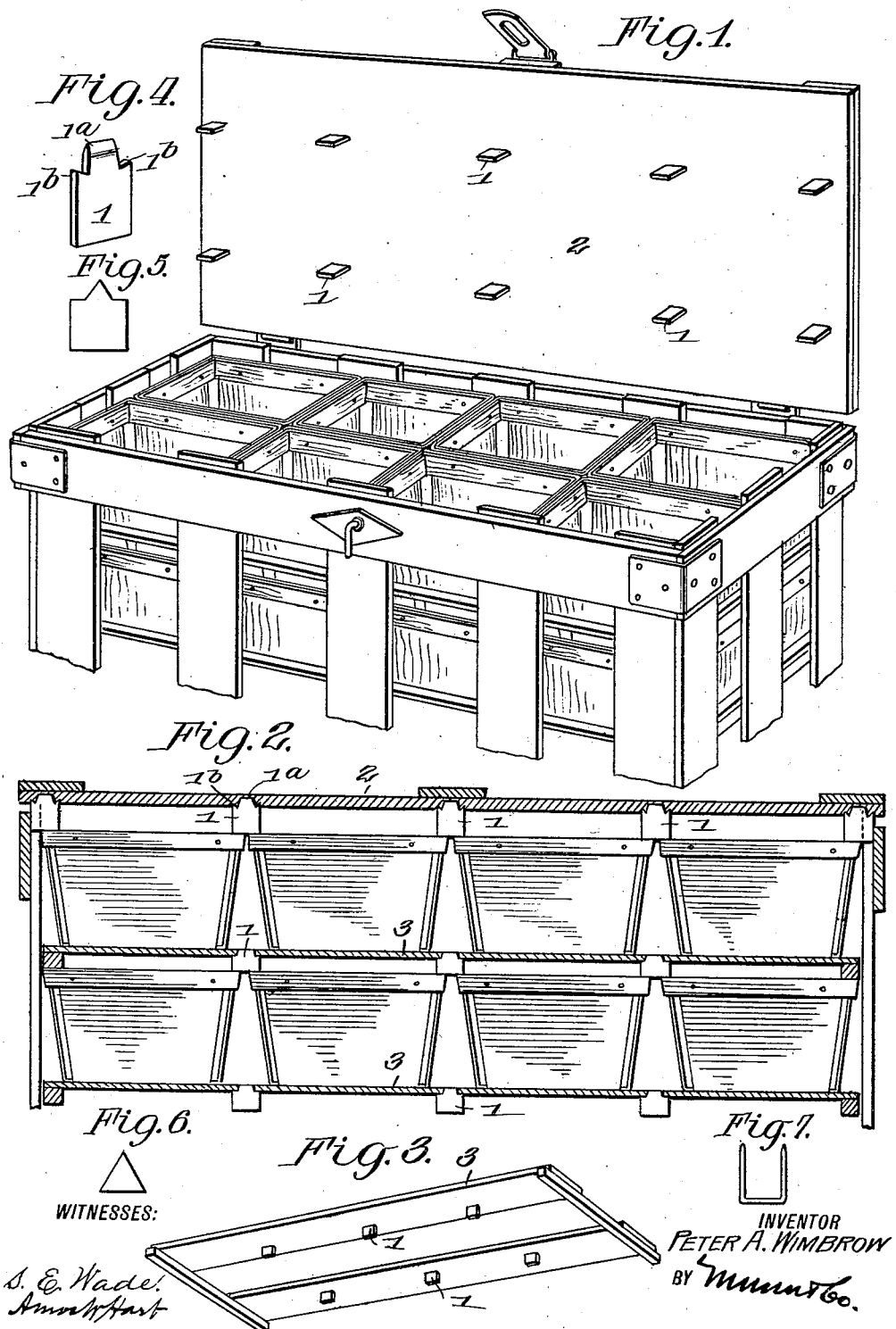

PETER A. WIMBROW, OF WHALEYSVILLE, MARYLAND.

BERRY-CRATE ATTACHMENT.

1,011,692.  Specification of Letters Patent.  Patented Dec. 12, 1911.

Application filed December 8, 1910. Serial No. 596,223.

*To all whom it may concern:*

Be it known that I, PETER A. WIMBROW, a citizen of the United States, and a resident of Whaleysville, in the county of Worcester and State of Maryland, have invented certain Improvements in Berry-Crate Attachments, of which the following is a specification.

As usually constructed, the lids or covers and also the trays or partitions of fruit-crates are provided with transverse wooden ribs or slats for holding the berry-boxes in place, or preventing their vertical movement during shipment; but such retainers are objectionable owing to the fact that they come in contact with the berries that lie adjacent to the end edges of the boxes on which they are arranged to bear, and thus they bruise, distort, or otherwise injure the fruit more or less.

I have devised a cheap, easily applied, and effective substitute for such retainers which will hold the berry-boxes securely in place without the possibility of injury to their contents.

The invention is embodied in the construction, arrangement, and attachment of the device as hereinafter described, and illustrated in the accompanying drawing, in which—

Figure 1 is a perspective view of the upper portion of a fruit-crate provided with my invention, the lid or cover of the crate being shown raised for better illustration. Fig. 2 is a longitudinal section of the upper portion of the crate, the lid or cover being closed. Fig. 3 is a perspective view of a tray or partition of the crate provided with my attachment. Fig. 4 is a perspective view of the device or retainer proper. Figs. 5, 6, and 7 show modified forms of the retainer.

As shown in Figs. 1 to 4 of the drawing, my improved retaining device 1 consists of a flat metal plate, preferably iron or steel, and in substantially rectangular form and provided at one end with a central point or projection 1ª which is adapted to be forced into the wood, that is to say, into the under side of the crate lid or cover 2 and the crate tray or partition 3, as shown best in Fig. 2. The point 1ª is preferably beveled or sharpened, as shown in Fig. 4, to adapt it to be more easily inserted in the wood, and the shoulders 1ᵇ on either side of said point are also preferably formed at an acute angle, so that they are in turn adapted to enter the wood a short distance and thus assist materially in bracing or supporting the retainer and adding rigidity to the attachment. As shown, the retainers are arranged in rows, extending lengthwise of the cover and tray and separated transversely by a distance about the same as the width of a berry-box. Thus, when the cover is closed or the tray 3 is put in place, the retainers attached thereto will bear upon the end edges of the fruit-boxes—see particularly Fig. 2.

It will be seen that the retainers cannot come in contact with and bruise or otherwise injure the berries that may lie adjacent to the portions of the boxes on which they bear, and yet the device operates as a perfectly effective substitute for the ordinary rib or slat attachment.

Fig. 5 shows a retainer of a form similar to 1, save that its piercing point is acute angled instead of being truncated.

Fig. 6 shows a retainer consisting of a triangular metal plate; and Fig. 7 shows a retainer in the form of a wire staple.

What I claim is:—

A wooden fruit-crate cover having on its under side a series of retainers for small fruit-boxes or baskets, said retainers being formed of thin and narrow metal plates having piercing points and adjacent shoulders, and being inserted in the under side of the cover at different separated points which are directly over the edges of the boxes or baskets, and projecting into contact with the latter as shown and described.

PETER A. WIMBROW.

Witnesses:
 E. C. FULTON,
 H. W. RUARK.